Patented May 13, 1952

2,596,845

UNITED STATES PATENT OFFICE 2,596,845

TREATMENT OF WELLS

Joseph B. Clark, Tulsa, Okla., assignor to Stanolind Oil and Gas Company, Tulsa, Okla., a corporation of Delaware No Drawing. Application May 28, 1948,
Serial No. 29,932

3 Claims. (Cl. 166—21)

This invention pertains to the treatment of oil and gas wells. More particularly, this invention pertains to a method of increasing the productivity of an oil or gas well by providing lateral drainage channels in selected formations adjacent a well. Certain subject matter disclosed herein is disclosed and claimed in my continuation-in-part application Serial No. 136,394, and certain other subject matter disclosed herein is disclosed and claimed in Riley F. Farris application Serial No. 136,395.

In the art of increasing the productivity of oil and gas wells, various methods have been proposed for increasing the drainage area within a selected producing zone. For example, nitroglycerin is detonated in a well in some cases either to enlarge the well diameter or fracture the formations immediately adjacent a well. The use of nitroglycerine in this art is, however, restricted in many cases due to the presence of pipe in the hole, the expense, the hazards, etc. Horizontal drilling is likewise adapted to increase the surface area of a well in a selected zone. The increased productivity, however, is rarely commensurate with the increased cost. Furthermore, both of these processes are further limited by their inability to extend the drainage channels an appreciable distance into the selected zone. Acidizing is sometimes practiced to increase the permeability of the formations adjacent a well, but this process is generally limited to use in calcareous formations.

Accordingly, it is an object of this invention to provide an improved method of completing wells. Another object of this invention is to provide an improved composition for fracturing producing formations. A more specific object of this invention is to provide a method of fracturing a formation penetrated by a well by injecting a viscous oily liquid into the formation and reducing the viscosity of this oily liquid in situ in the formation whereby a permeable channel is produced in the formation to conduct fluids from the formation into the well.

In the present invention, which is directed generally to an improved method of producing permeable channels to remote points in the fomation, viscous low-penetrating liquid is produced by the addition of bodying or gelling agents to liquids, preferably oily liquids. These channels, from remote points in a formation into a well, are created by application of hydrostatic pressure to these low-penetrating oily liquids sufficient to crack a formation. To produce a fracture, I first place the low-penetrating oily liquid in the well opposite the zone to be fractured. Pressure is then applied to the liquid and due to its retarded tendency to filter through the formations a pressure is built up in the well sufficient to produce a fracture, generally along a bedding plane where the tensile strength of the rock is weakest. The invention is, however, not limited to fracturing formations along a horizontal plane for occasionally, especially in non-stratified formations, the formation appears to fracture along a vertical plane. In any case the low-penetrating liquid is pumped into the well at a rate which causes the pressure to rise to the point that a fracture occurs. This pressure is recognized generally by a sharp break in pressure after which the liquid may be injected into the formation crevice without a substantial increase in pressure. This viscous low-penetrating liquid then, having a tendency to retard flow of the interstitial or formation fluids from the formations through the fracture, is removed by contacting it with a viscosity breaker or peptizer and producing the well.

It has been proved in the laboratory that when a fracture is created in a relatively impermeable core and the fracture is then closed, the permeability of the core is substantially increased. Laboratory data have been corroborated in wells where it has also been proved that the permeability may be further increased by the introduction of formation props or spacer materials such as sand, crushed shell, metal, wood or plastic objects or the like with the low-penetrating liquid or the peptizer. Preferably, however, I place the props or spacer objects in the low-penetrating liquid.

I employ as viscous liquid, preferably an oily liquid such as a higher alcohol, a crude oil, a refined oil such as gasoline, kerosene, naphtha, fuel oil, diesel oil, an animal oil such as lard oil or fish oil, a vegetable oil such as cottonseed oil, chlorinated hydrocarbons, or the like, containing bodying agents, i. e., an agent which tends to thicken a liquid and thereby reduce substantially its filtrate rate as, for example, a high molecular weight linear molecule or polymer, such as salts of the fatty acids, rubber or the like which are at least partially oil soluble. While the invention is not limited to oily liquids, liquids which are miscible with the interstitial crude oil in the formation to be fractured are preferred since liquids immiscible with the interstitial crude oil generally tend to reduce the permeability of the pores in the formation to oil. That is, aqueous liquids containing a bodying agent such as hydrated starch or water soluble soaps produce a fracture of the same type as the oily liquids but since the contamination of a formation having low permeability with water tends to decrease its permeability to oil, aqueous liquids are generally not used. Therefore, while aqueous liquids containing bodying agents are within the purview of this invention, I prefer an oily liquid containing a bodying agent. Soaps produced by or from ammonia or any metal of the alkali metal and alkaline earth metal groups or polyvalent metal groups such as, for example, magnesium, calcium, strontium, cadmium, mercury, lithium, cobalt, lead, nickel or aluminum combined with a fatty acid produce suitable bodying agents for the lighter oily liquids. The fatty acid is preferably one of the aliphatic acids carrying at least one carboxyl group in aliphatic chain linkage, the aliphatic chain in either case having preferably at least 12 carbon atoms in said chain. Suitable fatty acid compounds which are available commercially are, for example, coconut oil fatty acids, peanut oil fatty acids, palm oil fatty acids, stearic acid, oleic acid, palmitic acid, and the like.

While the salts of fatty acids are in general suitable bodying agents for producing a suitable viscosity in the hydrocarbon, I employ a metallic soap preferably a hydroxy aluminum soap bodying agent which has the ability to form hydrocarbon gels at ordinary temperatures. A suitable soap of this type can be considered as compounded from two distinct components. One is aluminum laurate or a saturated fatty acid soap containing at least 40–50% of this substance or of a functionally related acid soap; this component is a relatively high-melting solid that, by itself, produces only thin and unstable gels. The second component is an aluminum soap or soaps selected from the group including soaps of cycloaliphatic and unsaturated acids—that is, an aluminum naphthenate, oleate, oleate-linoleate or the like. The combination of an aluminum soap of the laurate type with one or more soaps of the naphthenate-oleate type give a thickening or bodying agent of distinctive and superior properties not found in either component and when prepared by the precipitation process, a solid is produced which withstands ordinary handling and storing conditions and which is readily soluble in the oily liquid to produce a highly viscous liquid or gel. I have found that at about 75° F., for example, from about 3% to about 10% of this type soap disperses in gasoline in from about 15 seconds to about 10 minutes and that gels having a suitable filtrate rate and viscosity are produced within from about 30 seconds to about 20 minutes.

I have found that from about 0.5% to about 10% by weight relative to the oily liquid of this hydroxy aluminum soap, preferably between about 3% and about 6% produces a suitable gel for fracturing most formations in accordance with this invention. Where the soap may be deteriorated as by weathering or contaminated as by moisture, it is sometimes desirable to use even more than 10%. In accordance with the preferred embodiment of this invention, the oily liquid is weighed or otherwise measured and the soap is added in a tank as the liquid is stirred. Sometimes the liquid may be heated to advantage. A flow type mixer for the soap and the oily liquid may be used at the well head with soap which reacts readily to produce a gel in the oily liquid. I have found that the gel will develop in the well. Therefore, since the more viscous gels are difficult to pump, the soap-liquid dispersion may be introduced into a well before the maximum viscosity is reached. Accordingly, when the gelation has proceeded to a point at which the viscosity is sufficient to maintain substantially all the particles of undispersed soap in suspension, the dispersion is pumped into the well. The gel may be injected immediately into the formation or it may be allowed to stand in the well until the maximum gelation has developed as indicated by a sample retained at the surface. By this means, high viscosity liquids are available for producing the fracture where such liquids would not be pumpable by normal pumps.

When substantially the maximum gelation of the hydrocarbon has been obtained, it is pumped into position in a well, preferably into a confined zone of a well where the fracture is to be produced, i. e., a zone in the well which has been isolated by one or more packers. Any amount of the viscous liquid may be injected into a formation fracture depending upon the size of fracture desired. A filler fluid, i e., an inert fluid such as crude oil or a refined oil such as gasoline or kerosene which has no effect upon the gel may be injected into the well after the injection of the viscous liquid to force the viscous liquid further into the formation. Preferably a peptizer or gel breaker is injected into the well immediately after the viscous liquid. In any case, when the viscous liquid reaches the formation, due to its retarded tendency to filter through the formations, a substantial increase in pressure at the surface will be noted. The pressure rises after the viscous liquid or gel reaches the isolated formation until a rather abrupt drop occurs indicating a formation fracture. Any amount of the liquid may then by pumping at a substantially constant rate be injected into the formation without a substantial increase in pressure. This pressure at which an abrupt pressure drop occurs is the pressure hereinafter referred to as the "formation breakdown pressure" and is roughly equivalent in pounds per square inch at the formation fractured to the depth of such formation in feet. This pressure varies, however, from place to place depending upon the depth and the nature of the formations, folding of the formations and the like. A weighting material such as barytes, iron filings, iron oxide or the like may be incorporated in the viscous liquid not only as a prop but to produce additional hydrostatic pressure at the formation. If sufficient weighting material is added, it is sometimes unnecesary to apply pump pressure to fracture a formation.

Inasmuch as this viscous liquid tends to obstruct the flow of the interstitial fluids from the fractured formation into the well, it is removed therefrom after it has produced a fracture of suitable proportions. A peptizer or gel breaker may be incorporated in the viscous liquid and become effective after a time delay. For example, from about 1% to about 3% by volume of water which becomes effective several hours after the viscous liquid has reached the fracture may be incorporated in the viscous liquid as, for example, by emulsification or the like. Likewise other gel breakers which become effective at the temperature of the formation may be incorporated in the viscous liquid. The gel breaker may also be injected into the fracture prior to or after the viscous liquid. In some cases, particularly in deep wells, the heat from the formation is sufficient to reduce the viscosity or gel so that the fracturing liquid may be completely removed from the interstices of the formation. Among suitable materials for breaking the gel and reducing the viscosity of soap-hydrocarbon gels, I have found the water-soluble amines such as ethanolamine or similar ammoniacal compounds and the oil soluble sulfonates to be particularly effective. Other suitable gel breakers are ammonia, alkali oxides and hydroxides and the stronger acids. Generally about 1% breaker, based upon the volume of the fracturing liquid, diluted with a suitable solvent such as gasoline is pumped into the well following the fracturing liquid to reduce the viscosity or break the gel so that when the well is produced the sol will flow out of the formation. More than 1% of the breaker is sometimes required, particularly where the soap content is high.

While, as indicated above, the breaker is preferably injected into the fracture through the well following the fracturing liquid, I have found that some of the gels, particularly those produced by the hydroxy aluminum soaps, may be broken by the interstitial fluids in most formations. Breaking the gel by this means is necessarily slow since the gel must be adapted to withstand the peptization effect of the gel breaker for sufficient time to permit placement of the gel. Thus, while it is not generally desirable to break the gel by the action of the interstitial fluids due to the necessary delay, such procedure is within the purview of this invention.

As pointed out above, props, preferably sand, are incorporated in the viscous liquid either during mixing or during the time it is being injected into the well. These props, due to the high suspending forces of the viscous liquid, are carried into the formation fracture with the viscous liquid. Since these liquids have only a temporary high viscosity, i. e., since this high viscosity is subsequently broken in the fracture, the props are deposited in the fracture and held there by the formation as the fracture is collapsed so there is no tendency for the props to flow back into the well as the well is produced and as the sol flows back into the well.

As an example of the effect of my invention on the operation of a woodbine sand well, a well in the East Texas Field, which on a production test prior to treatment in accordance with my invention produced less than 1 barrel of oil per day with no water, was treated as follows:

The well had 3505 feet of 2-inch tubing with a formation packer located on the bottom. Total depth of the well was 3551 feet and the open hole between the packer and total depth was 4¾ inch diameter. A fracturing liquid was made up by adding 6% (by weight) of aluminum soap as above described in the preferred embodiment to 23 barrels of East Texas crude oil. The soap was added to the crude oil while the crude oil was agitated. The crude oil was at a temperature of about 73° F. Agitation was continued for an hour at which time the viscosity was approximately 200 centipoises on the Stormer viscosimeter operating at 600 R. P. M. When the viscosity of the fracturing liquid reached 200 centipoises, injection into the well at the rate of 4.68 barrels per minute was started with 160 lbs. of plaster sand being mixed into the fracturing liquid at the pump suction at a uniform rate to produce a mixture of about 0.15 pound of sand per gallon of the liquid. After the fracturing liquid had been injected into the tubing, it was followed immediately by two barrels of East Texas crude oil for the purpose of separating or spacing the fracturing liquid from the gel breaker which then followed immediately at substantially the same injection rate. This gel breaker, which had been compounded before injection of the fracturing liquid started, consisted of 24 barrels of gasoline containing 35 gallons of 60% oil-soluble sulfonates and 40% aromatic petroleum solvents. Immediately following the gel breaker solution, 25 additional barrels of East Texas crude oil were pumped into the well to displace the gel breaker from the tubing and the well into the formation. The formation breakdown pressure was approximately 3400 pounds per square inch, and the pressure dropped thereafter to the effective overburden pressure, which was approximately 2700 pounds per square inch. After the crude oil was injected, the well was allowed to stand idle for 48 hours to permit a substantial reduction in the viscosity of the fracturing liquid. On a production test which followed immediately the well pumped oil at the rate of approximately 70 barrels per day. Inasmuch as 122 barrels of fluid had been pumped into the well, the initial production obviously included the injected liquids. However, after two weeks the sustained production (pumping) was at the rate of 50 barrels of oil per day with no water.

Examples of other successful treatment are given in Table I.

*Table I*

| Field | Depth to Zone of Fracture, ft. | Formation Breakdown Pressure, p. s. i. | Fracturing Liquid, Gal. | Production, Bbl. per day— | |
|---|---|---|---|---|---|
| | | | | Before | After |
| Frannie Field, Wyoming | 3,025–3,146 | 1,850 | 900 | 60 | 160 |
| E. Sasakwa Field, Oklahoma | 2,717–2,752 | 2,050 | 1,000 | 0 | 6 |
| Rangely Field, Colorado | 5,890–6,250 | 4,900 | 800 | 75 | 140 |

Aside from the above, this invention has particular application in testing formations during drilling, i. e., during the time that the drilling fluid is in the well. In this embodiment of the invention a formation to be fractured is preferably isolated from the remainder of the well, thereby limiting the area in which a fracture can occur. A drill stem test is then carried out using, for example, apparatus shown in U. S. Patent No. 2,229,635. Packers may be lowered into a well on drill pipe, for example, and set above and below the formation or area to be fractured, thus excluding from the fracture to a large measure the drilling fluids which would otherwise enter the fracture and lower the permeability thereof. The drilling fluid which is deleterious to the permeability of a fracture is preferably displaced from the drill pipe and the isolated zone through a circulation joint or the like by, for example, water, oil, or the viscous liquid. When the fracturing liquid which is pumped down the drill stem following the drilling fluid, the water, or the oil, reaches the isolated zone, the circulation joint is closed and pressure is applied at the surface until the formation breakdown pressure is reached. Then, as described above, the viscous liquid may be injected into the fracture in any amount and subsequently removed as by a gel breaker and by producing the well through the drill pipe. To avoid contamination of this fracture by the drilling fluids which tend to produce an impermeable filter cake in the fracture, the packers which isolate the zone are maintained seated until the gel in the fracture is broken and a production test consummated. Thus, the fractured formation is available for testing during drilling and before the drilling fluid is removed from the hole. If the production test is unfavorable, the fracture is immediately plugged by the drilling fluid or by cement and has no adverse effect upon future drilling operations.

Thus, it will be apparent that my invention is susceptible of a great variety of embodiments and therefore the invention is not to be construed to be limited to the above-described embodiments. It is defined best by the appended claims.

I claim:

1. A method of determining the fluid productivity of a formation in a well comprising the steps of isolating a section of the well to be tested from other portions of said well, disposing a gelled oily liquid in said section, subjecting said liquid to a pressure equal to the formation breakdown pressure to produce a fracture in said section and force said liquid thereinto, reducing the viscosity of said liquid in said fracture by contacting said liquid with a gel breaker therefor for a prolonged period of time, decreasing the hydrostatic head on said section to produce well fluids from said isolated section to the exclusion of well fluids from other portions of said well, and determining a characteristic of the produced well fluids, said section at all times being maintained isolated from said other portions of said well.

2. A method of determining the fluid productivity of a formation in a well being drilled by the rotary process wherein drilling mud is circulated through a drill pipe, comprising the steps of isolating a section of said well from other portions thereof by lowering at least one packer into said well on said drill pipe, setting said packer at the upper boundary of said section, said drill pipe having an opening below said packer, displacing drilling mud from said drill pipe above said isolated section, pumping a low penetrating liquid down said drill pipe through said opening into said isolated section, subjecting said liquid to a pressure equal to the formation breakdown pressure to produce a fracture in said section and force said liquid thereinto, pumping a gel breaker for said liquid down said drill pipe into said section and said fracture, whereby the viscosity of said liquid is substantially reduced, thereafter producing said well through said drill pipe while maintaining said packer seated, and determining a characteristic of well fluids produced through said drill pipe.

3. A method according to claim 2 in which said gel breaker is a strong acid.

JOSEPH B. CLARK.

REFERENCES CITED

The following references are of record in the file of this patent:

UNITED STATES PATENTS

| Number | Name | Date |
| --- | --- | --- |
| 657,951 | Mooney | Sept. 18, 1900 |
| 2,233,271 | Staudt | Feb. 25, 1941 |
| 2,264,353 | Zimmer et al. | Dec. 2, 1941 |
| 2,300,325 | Leeuwen | Oct. 27, 1942 |
| 2,332,822 | Williams | Oct. 26, 1943 |
| 2,354,570 | Benckenstein | July 25, 1944 |
| 2,365,037 | Zimmer et al. | Dec. 12, 1944 |
| 2,379,516 | Garrison | July 3, 1945 |

OTHER REFERENCES

Torrey, P. D., "Selective Exclusion of Fluids from Wells," The Oil Weekly, pages 26 to 35. May 22, 1939.